(No Model.)
J. H. THOMAS.
Walking Seed Planter.
No. 240,341. Patented April 19, 1881.
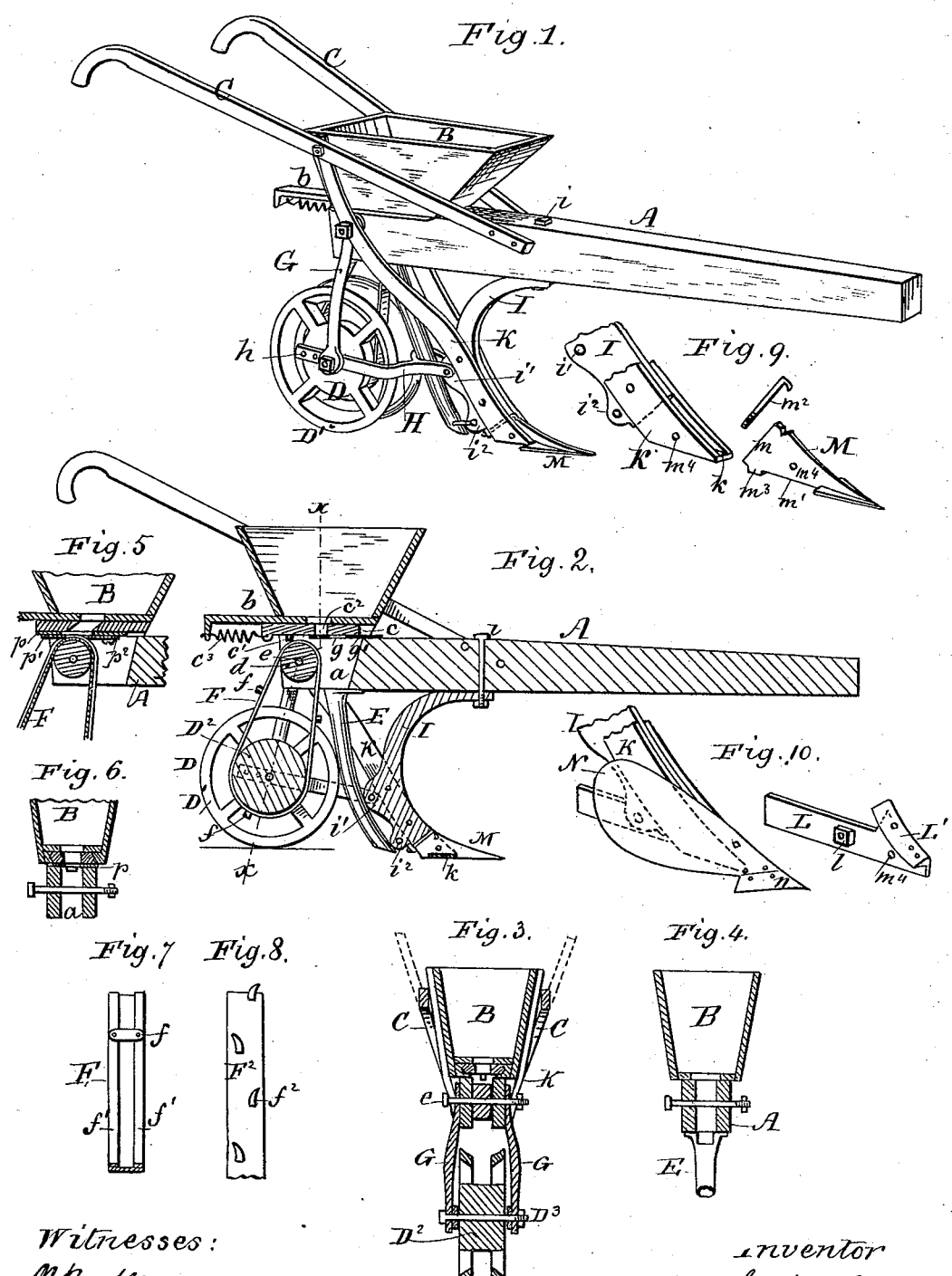
Witnesses:
W. B. Masson
W. E. Bowen
Inventor
Joseph H. Thomas,
E. E. Masson
atty

UNITED STATES PATENT OFFICE.

JOSEPH H. THOMAS, OF PILOT POINT, TEXAS.

WALKING SEED-PLANTER.

SPECIFICATION forming part of Letters Patent No. 240,341, dated April 19, 1881.

Application filed July 6, 1880. (No model.)

*To all whom it may concern:*

Be it known that I, JOSEPH H. THOMAS, of Pilot Point, in the county of Denton and State of Texas, have invented a new and valuable Improvement in Walking Seed-Planters; and I do hereby declare that the following is a full, clear, and exact description and operation of the same, reference being had to the annexed drawings, making a part of this specification, in which—

Figure 1 represents a perspective view of the improved planter. Fig. 2 represents a sectional elevation of the same. Fig. 3 is a transverse section on line $x\ x$ of Fig. 2. Fig. 4 is a transverse section through the hopper and main beam, as arranged for planting cotton-seed. Figs. 5 and 6 represent, respectively, in longitudinal and transverse section, the seed-hopper with the bottom thereof arranged for planting wheat, rye, barley, oats, &c. Fig. 7 and 8 represent, respectively, and on an enlarged scale, the belts used in connection with the device for planting wheat, rye, &c., or cotton. Fig. 9 represents details of the standard, subsoil-share, and locking-bolt therefor. Fig. 10 represents details of the standard, mold-board, and land-bar, to be used with the device for planting wheat, rye, &c.

My invention relates to walking-planters suitable for corn, cotton, wheat, or other seeds to be planted in rows.

The object of my invention is to construct a simple and compact apparatus, provided with a seed-box, and adapted to be transformed into a seed-planter provided with a subsoil-share or a mold-board.

Heretofore walking seed-planters have been provided with various means for transmitting motion from the ground-wheel shaft to the seed-wheel or seed-box slide, either by means of projecting pins upon said ground-wheel and suitable levers, or by means of a belt placed upon pulleys located on one side of said wheel.

The object of my invention is to simplify this construction; and my invention consists in a walking planter provided with a ground-wheel in the rear of the plowshare, said wheel having its edges beveled toward the center to operate as a seed-covering wheel, and also a central belt-pulley cast therewith or secured thereto, to transmit motion, by means of a belt, to another pulley located in a vertical mortise formed within the rear end of the main beam.

My invention consists, also, in combining with the pulley of a seed-planter located in the axis of the device belts of peculiar construction to operate said device.

It consists, also, in the peculiar construction of the double standard, its central brace, and the fastenings used to connect a subsoil-share, or a landside and mold-board, to said standard, as will be hereinafter described in connection with the drawings, and then pointed out in the claims.

In the drawings, A represents the beam, B the seed-box, and C the handles, of the device. The seed-box is placed centrally over the rear portion of the beam and between the handles. It is provided with a removable bottom, $b$, to adapt the device to planting cotton-seed, the box being then as shown in Fig. 4; but the whole device is intended, mainly, for planting corn in hills, for which purpose the seed-box is provided with a slide, $c$, as shown in Fig. 2.

To render this planter compact and its parts easily interchangeable, the rear end of the beam is provided with a slot, $a$, and in this slot is placed a pulley-wheel, $d$, upon an axle, $e$, passing through the side of said beam.

At a short distance under, and somewhat in the rear of, a vertical line passing through the axis of the pulley $d$ there is a ground-wheel, D, formed of two plain or perforated disks, D′, beveled toward the center to form a ridge upon the newly-disturbed ground and assist in covering the seed that may have been dropped in the furrow in the rear of the plowshare. Between the disks D′ there is a pulley, $D^2$, preferably cast in one piece with the disks of this ground-wheel, and around said pulley $D^2$ and the pulley $d$ is placed an endless belt, F, of a form adapted to either operate the seed-box slide $c$ for planting corn or to guide or convey wheat or cotton-seed to the tube E.

When it is desired to plant corn in hills the belt F is provided with a series of transverse bars, $f$, upon its outer face, to engage in its rotation with a pin, $c'$, secured to the under side of the box-slide and advance the latter until its grain-receiving perforation $c^2$ coincides with a perforation in a thin metal plate, $g'$, located under the seed-slide. The transverse bars $f$ then escape in their downward course, and the seed-slide is retracted to its normal position, as shown in Fig. 2, by the spring $c^3$, having one end secured to the slide and the other to a prolongation of the bottom $b$ of the seed-box.

The ground-wheel D is secured to the beam A, centrally under it, by a brace, G, on each side thereof, having an eye at each end, through which pass the axle-bolts of the wheels $d$ and D. This wheel D is also retained in position by two flat braces, H, secured at one end to the rear of the standard-brace I, and provided with a series of perforations, $h$, at the other end, through a pair of which the axle-bolt $D^3$ of the ground-wheel passes, and is retained by a nut.

The standard is of peculiar construction, being formed of two flat bars, K, extending to the handles, and formed in one piece with or united by a sole-plate, $k$, parallel with the beam A. The lower portion of this standard is united to the under side of the beam A by the bent brace I. This brace is placed between the two bars K of the standard and riveted or bolted thereto, a bolt, $i$, securing one end thereof to the beam. The said brace projects in the rear of the standard, or is provided with lugs $i'$ and $i^2$, the lug $i'$ being perforated to receive the short bolt, that passes also through the forward end of the braces H of the ground-wheel, and the lower lug, $i^2$, is also perforated to receive either a strap to retain the lower end of the seed-tube E or short wings to cover the seed after it escapes from said tube, or a bolt to unite the landside or bar L of a mold-board plow, said bolt then passing through the perforated bars $l$, Fig. 10, on the inner side of said landside. The standard-brace I does not extend as far down as the sole-plate $k$ of the standard, and its lower end is at such an angle as to form an abutting shoulder for the subsoil-share M. For this purpose the rear end, $m$, of said share forms a similar angle with the horizon. The share is recessed on the under side, at $m'$, to fit over the sole-plate $k$ of the standard, and after being put in place upon said sole-plate the hooked bolt $m^2$ is passed between the rear end, $m$, of the share and the lower end of the brace I, a nut on the lower end of said bolt securely uniting said share and standard, the heel $m^3$ preventing the point of the share becoming out of line with the bottom of the sole-plate of the standard. A short transverse bolt may also be used through the perforations $m^4$, if desired.

When a mold-board share, Fig. 10, is to be used with the standard (mainly for wheat-planting) the subsoil-share is removed, the mold-board N and point $n$ are bolted or riveted to the land-bar L, and the latter secured by a short bolt passing through the perforations $m^4$ in the standard, and another bolt passing through the perforation in the boss $l$ and through the lower lug, $i^2$, in the rear side of the standard-brace. To secure the mold-board and point at the proper angle, the land-bar is provided with a beveled upper flange, L', thicker on the land-bar side than the other, and provided with suitable holes for bolts or other fastenings.

I have partly described the endless belt F as provided with transverse bars $f$ to operate the seed-box slide; but it has also another feature. (Shown on an enlarged scale in Fig 7.) It is a grooved belt formed of a flat band, with two narrow strips, $f'$, of leather, secured adjoining the edge thereof, to retain the seed in the center. When this belt is used in planting wheat the transverse bars $f$ are removed, and it is made to run in close contact with the bottom of the seed-box, as shown, Fig. 5, the edges of the seed-opening in the bottom of said seed-box being covered with leather $p$ above the strips $f'$ of the belt. A central tongue, $p'$, of leather, enters the groove of the belt and keeps the wheat from escaping into the rear of the pulley $d$, while an adjustable central tongue, $p^2$, made of leather or bristles, slightly entering the groove in the belt on its forward side, regulates the flow of the grain.

When the device is to be fitted for planting cotton-seed the bottom of the seed-box is removed, allowing the seed to enter and lodge in the mortise $a$ of the beam A, and a belt, $F^2$, provided with staggered and hooked spikes $f^2$ is used, the latter drawing the seed from the mass and dropping said seed singly into the said tube E in the rear of the standard, the land-bar L being sometimes used in connection with the subsoil-plow to prevent the closing of the furrow before the seed is deposited therein.

I am aware that corn and cotton planters have been constructed with a frame having divergent arms extending in the rear of the beam, and that truncated conical rollers have been placed between said divergent arms; and also, that others have been provided with a pair of carrying-wheels on the outside of said divergent arms; but either construction produces a more unwieldy device than I obtain with a slotted beam and a grooved wheel, as located under the rear end of said slotted beam.

Having now fully described my invention, I claim—

1. In a walking-planter, the combination of a beam, A, slotted in its rear end, a standard formed of two flat bars, and a sole-plate parallel with said beam, with a bent brace, I, secured between the bars of the standard, and lugs $i'$ and $i^2$ in the rear of said brace, substantially as and for the purpose described.

2. The combination of the beam A slotted in its rear end, standard K, and brace G, secured by a single bolt, $e$, carrying a wheel, $d$, with a ground-wheel, D, having its edges beveled toward the center and formed with a belt-wheel, $D^2$, in the axis of a walking-planter, substantially as and for the purpose described.

3. The combination of the beam A, standard-bars K, curved brace I, having lugs $i'$ and $i^2$, and braces G and H, with ground-wheel disks D', and belt-wheel $D^2$, located centrally between said disks, substantially as and for the purpose described.

4. The combination of a seed-box, beam A, having central slot, $a$, in its rear end, belt-wheel $d$ in said slot, ground-wheel under the beam, and having a belt-wheel, $D^2$, in the center thereof, beveled disks D, and belt F, with strips $f'$ secured thereon adjoining the edges thereof, substantially as and for the purpose set forth.

5. In a walking-planter, the combination of a beam, A, standard-bars K, sole-plate $k$ parallel with said beam, bent brace I, with share M, having recess $m'$ to fit over sole-plate, heel $m^3$, and bolt $m^2$, substantially as and for the purpose described.

JOSEPH H. THOMAS.

Witnesses:
 E. E. MASSON,
 JAS. A. HUFF.